United States Patent
Im et al.

(10) Patent No.: US 8,713,427 B2
(45) Date of Patent: Apr. 29, 2014

(54) APPARATUS AND METHOD FOR EXTRACTING CASCADING STYLE SHEET RULES

(75) Inventors: Dong-Woo Im, Yongin-si (KR); Seung-Mo Cho, Seoul (KR); Sung-Hak Lee, Yongin-si (KR); Soon-Cheol Hong, Hwaseong-si (KR); Sung-Jong Seo, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 77 days.

(21) Appl. No.: 13/169,756

(22) Filed: Jun. 27, 2011

(65) Prior Publication Data

US 2012/0124464 A1     May 17, 2012

(30) Foreign Application Priority Data

Nov. 12, 2010    (KR) ........................ 10-2010-0112850

(51) Int. Cl.
  *G06F 17/24*     (2006.01)
  *G06F 17/26*     (2006.01)

(52) U.S. Cl.
  USPC .......................................... 715/236; 715/234

(58) Field of Classification Search
  USPC ................................................. 715/234, 236
  See application file for complete search history.

(56) References Cited

U.S. PATENT DOCUMENTS

| | | | |
|---|---|---|---|
| 7,337,392 B2* | 2/2008 | Lue ............................... | 715/236 |
| 7,447,706 B2* | 11/2008 | Chtcherbatchenko et al. ....... | 1/1 |
| 7,650,063 B2* | 1/2010 | Jung et al. ..................... | 386/248 |
| 7,769,773 B1* | 8/2010 | Doubek et al. ................ | 707/769 |
| 8,086,953 B1* | 12/2011 | Gabber et al. ................ | 715/229 |
| 8,549,397 B2* | 10/2013 | Soldan et al. ................. | 715/236 |
| 2006/0224553 A1* | 10/2006 | Chtcherbatchenko et al. ... | 707/1 |
| 2010/0058172 A1* | 3/2010 | Soldan et al. ................. | 715/235 |
| 2011/0179346 A1* | 7/2011 | Dufour et al. ................. | 715/234 |
| 2013/0283148 A1* | 10/2013 | Lim et al. ..................... | 715/234 |

OTHER PUBLICATIONS

Jockman et al., "Enabling Low-Cost XML-Aware Searching Capable of Complex Querying", Isogen International, 21 pages (Mar. 2002), formerly available at http://www.isogen.com/papers/xml-aware_searching.html; currently available at https://ssl.bnt.com/idealliance/papers/xmle02/dx_xmle02/papers/03-02-08/03-02-08.pdf.*
Hyatt, "WebCore Rendering I-V", 18 pages provided (Aug. 2007), available at http://www.webkit.org/blog/114/webcore-rendering-i-the-basics, et seq.*
Hyatt, "Writing efficient CSS", 6 pages provided (Apr. 2000), https://developer.mozilla.org/en-US/docs/CSS/Writing_Efficient_CSS.*
W3C, "CSS2 Specification", 28 pages provided (Apr. 2008), http://www.w3.org/TR/2008/REC-CSS2-20080411/selector.html.*
CN 101344895A1 (Chinese Foreign Patent).*

* cited by examiner

*Primary Examiner* — Laurie Ries
*Assistant Examiner* — Soumya Dasgupta
(74) *Attorney, Agent, or Firm* — NSIP Law (57) ABSTRACT

Provided are an apparatus and method for extracting cascading style sheet (CSS) rules. The apparatus includes a generation unit configured to generate an identification list that includes identification symbols that correspond to one or more selectors, for each document object model (DOM) node. The apparatus also includes a rule extraction unit configured to select a target DOM node and extract one or more CSS rules that are applicable to the target DOM node based on identification symbols that are included in an identification list that corresponds to the target DOM node.

17 Claims, 5 Drawing Sheets

| p | h1 | style | img | form | div | a | table | |
|---|---|---|---|---|---|---|---|---|
| 1 | 1 | 0 | 0 | 0 | 1 | 0 | 0 | ...... |

~ 317

| | CSS rule | EXTRACT |
|---|---|---|
| 231 | p img {...} | O |
| 232 | div img {...} | O |
| 233 | h1 img {...} | O |
| 234 | table img {...} | X |
| 235 | p h1 img {...} | O |
| 236 | div h1 img {...} | O |
| 237 | a h1 img {...} | X |

FIG. 5

APPARATUS AND METHOD FOR EXTRACTING CASCADING STYLE SHEET RULES

CROSS-REFERENCE TO RELATED APPLICATION(S)

This application claims the benefit under 35 U.S.C. §119 (a) of Korean Patent Application No. 10-2010-0112850, filed on Nov. 12, 2010, in the Korean Intellectual Property Office, the entire disclosure of which is incorporated herein by reference for all purposes.

BACKGROUND

1. Field

The following description relates to a technique of extracting cascading style sheet (CSS) rules that may be applied to document object model (DOM) nodes that are included in a DOM node tree.

2. Description of the Related Art

With the development of techniques for processing and storing considerable amounts of data, various document formats for storing data have been developed. For example, data may be stored in word-processor documents, spreadsheet files, database files, portable document format (PDF) files, image documents, plain text files, and the like.

Documents may be written using various markup languages, for example, a Standard Generalized Markup Language (SGML), a Hyper Text Markup Language (HTML), an eXtensible Markup Language (XML), and the like. As the types of document formats diversify, the ability to share various types of data has become increasingly more complicated. In order to address this problem, the use of markup languages for structured non-systematic data and/or documents have been introduced.

Style sheets define the general style of web documents such as text, links, images, tables, and other elements. A cascading style sheet is a type of style sheet. In order to verify a cascading style sheet, it is necessary to extract CSS rules.

For example, a DOM node tree is generated using a markup language, and CSS rules applicable to each DOM node in the DOM node tree are extracted. However, if there are a large number of DOM nodes in the DOM node tree, it may take a great deal of time to extract the CSS rules that are applicable to each of the DOM nodes. Therefore, a method is needed to reduce the time used to extract CSS rules that are applicable to each DOM node.

SUMMARY

In one general aspect, there is provided an apparatus for extracting cascading style sheet (CSS) rules, the apparatus including a generation unit configured to generate an identification list that comprises identification symbols that correspond to one or more selectors, for each document object model (DOM) node, and a rule extraction unit configured to select a target DOM node and to extract one or more CSS rules that are applicable to the target DOM node based on identification symbols that are included in an identification list that corresponds to the target DOM node.

The generation unit may be further configured to generate an identification list each time a DOM node is generated.

The apparatus may further comprise an identification symbol input unit configured to enter identification symbols that correspond to one or more selectors that are included in a parent node of each of the DOM nodes into a corresponding identification list.

The apparatus may further comprise an identification list extraction unit configured to extract the identification list that corresponds to the target DOM node.

The rule extraction unit may be further configured to extract a CSS rule that has an end selector that is the same as a selector of the target DOM node, as a target CSS rule.

The rule extraction unit may comprise a first determiner configured to determine whether identification symbols that correspond to one or more parent node selectors that are included in the target CSS rule exist in the identification list that correspond to the target DOM node, and the rule extraction unit may be further configured to not extract the target CSS rule as a CSS rule that is applicable to the target DOM node in response to there being no identification symbols that correspond to the parent node selectors included in the target CSS rule in the identification list that corresponds to the target DOM node.

The rule extraction unit may further comprise a second determiner configured to determine whether the target CSS rule shares only one parent node selector with the identification list that corresponds to the target DOM node in response to the identification symbols that correspond to the parent node selectors included in the target CSS rule existing in the identification list that correspond to the target DOM node, and the rule extraction unit may be further configured to extract the target CSS rule as a CSS rule that is applicable to the target DOM node in response to the target CSS rule sharing only one parent node selector with the identification list corresponding to the target DOM node.

The rule extraction unit may further comprise a third determiner configured to, in response to the target CSS rule sharing more than one parent node selector with the identification list that correspond to the target DOM node, traverse a DOM node tree including the target DOM node and determine whether the DOM node tree is configured in the same sequence as that between the selectors included in the target CSS rule, and the rule extraction unit may be further configured to extract the target CSS rule as a CSS rule that is applicable to the target DOM node in response to the DOM node tree being configured in the same sequence as that between the parent node selectors included in the target CSS rule.

The identification symbols may be 1-bit digital values.

In another aspect, there is provided a method of extracting cascading style sheet (CSS) rules, the method including generating an identification list that comprises identification symbols that correspond to one or more selectors, for each document object model (DOM) node, selecting a target DOM node, and extracting one or more CSS rules that are applicable to the target DOM node based on identification symbols that are included in an identification list that corresponds to the target DOM node.

The generating the identification list may comprise generating an identification list each time a DOM node is generated.

The generating the identification list may comprise entering identification symbols that correspond to one or more selectors that are included in a parent node of each of the DOM nodes into a corresponding identification list.

The method may further comprise extracting the identification list that corresponds to the target DOM node.

The extracting the CSS rules that are applicable to the target DOM node may comprise extracting a CSS rule that has an end selector that is the same as a selector of the target DOM node, as a target CSS rule.

The extracting the CSS rules that are applicable to the target DOM node may comprise determining whether identification symbols that correspond to one or more parent node selectors included in the target CSS rule exist in the identification list that corresponds to the target DOM node, and not extracting the target CSS rule as a CSS rule that is applicable to the target DOM node in response to there being no identification symbols that correspond to the parent node selectors included in the target CSS rule in the identification list that corresponds to the target DOM node.

The extracting the CSS rules that are applicable to the target DOM node may further comprise determining whether the target CSS rule shares only one parent node selector with the identification list that corresponds to the target DOM node in response to the identification symbols that correspond to the parent node selectors included in the target CSS rule existing in the identification list that correspond to the target DOM node, and extracting the target CSS rule as a CSS rule that is applicable to the target DOM node in response to the target CSS rule sharing only one parent node selector with the identification list that corresponds to the target DOM node.

The extracting the CSS rules that are applicable to the target DOM node may further comprise traversing a DOM node tree including the target DOM node and determining whether the DOM node tree is configured in the same sequence as that between the selectors included in the target CSS rule, and extracting the target CSS rule as a CSS rule that is applicable to the target DOM node in response to the DOM node tree being configured in the same sequence as that between the selectors included in the target CSS rule.

The identification symbols may be 1-bit digital values.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
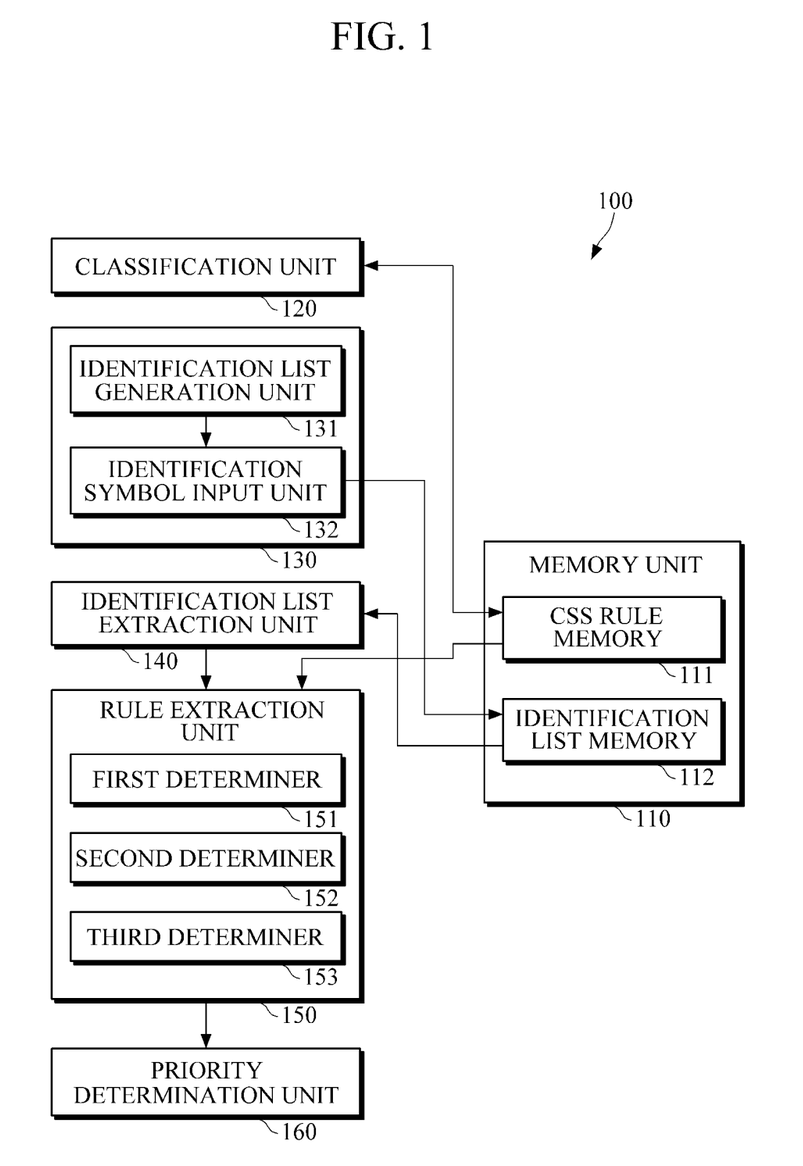
FIG. 1 is a diagram illustrating an example of an apparatus for extracting cascading style sheet (CSS) rules.

FIG. 1 illustrates an example of an apparatus for extracting cascading style sheet (CSS) rules.

Referring to FIG. 1, an apparatus 100 includes a memory unit 110, a classification unit 120, a generation unit 130, an identification list extraction unit 140, a rule extraction unit 150, and a priority determination unit 160. The apparatus 100 may be or may be included in a terminal, such as a mobile terminal, a computer, a smart phone, an MP3 player, and the like.

In this example, the memory unit 110 includes a CSS rule memory 111 and an identification memory 112. A CSS may include a selector and a declaration. For example, P {color: red} is a CSS that has 'P' as a selector and '{color: red}' as a declaration, wherein 'color' indicates a property and 'red' indicates the value of the property.

The memory unit 110 may be a storage medium that is capable of storing data available in and outside of the apparatus 100. The CSS rule memory 111 may store preset CSS rules and/or CSS rules that are classified by the classification unit 120.

The identification list memory 112 may store an identification list that includes identification symbols that correspond to one or more selectors. The identification list may include information that specifies one or more selectors that are included in each parent node of a particular document object model (DOM) node. For example, the identification list may include identification symbols that correspond to the selector(s) included in each parent node of the particular DOM node. As an example, the identification symbols may be a one bit digital value, a two bit digital value, a three bit digital value, and the like.

The classification unit 120 may receive CSS rules from the CSS rule memory 111 and/or an external storage medium. The classification unit 120 may classify the received CSS rules based on a predefined set of rules, and may store the results of the classification in the CSS rule memory 111.

Figure 2:
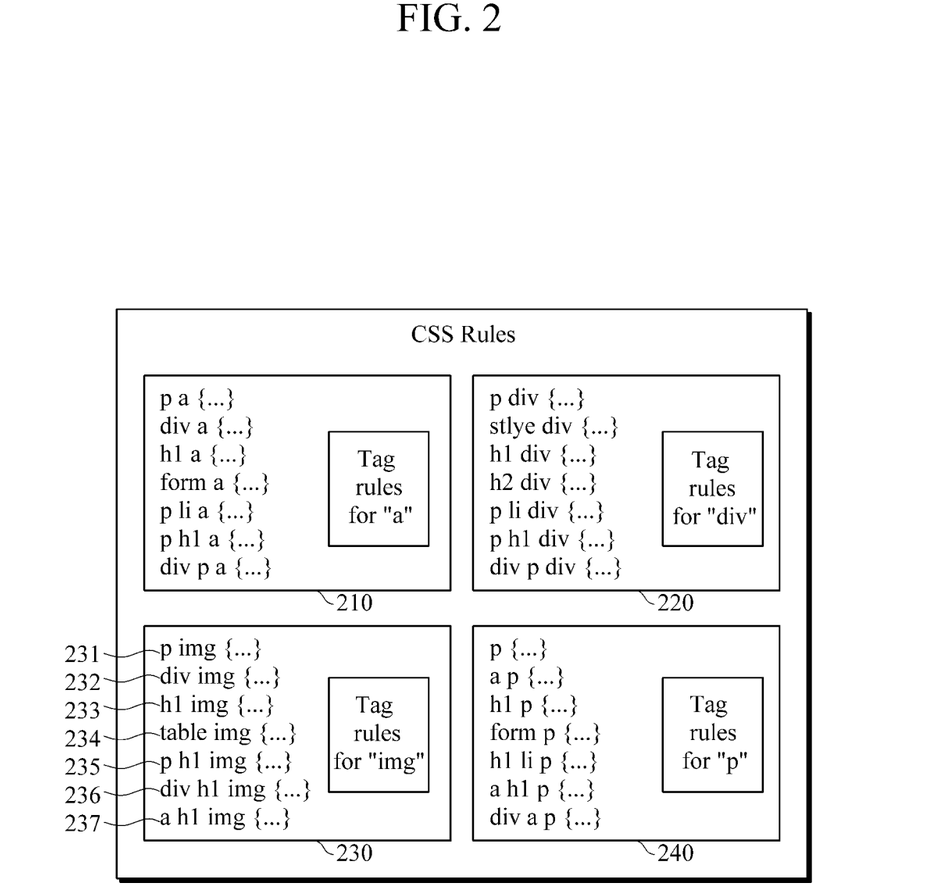
FIG. 2 is a diagram illustrating an example of the classification of CSS rules.

FIG. 2 illustrates an example of the classification of CSS rules. For example, the CSS rules may be classified by the classification unit 120 shown in FIG. 1.

Referring to FIG. 2, the classification unit 120 may classify CSS rules according to their end selectors. For example, the classification unit 120 may classify the CSS rules into a group that includes CSS rules 210 that have an end selector of 'a,' a group that includes CSS rules 220 that have an end selector of 'div,' a group that includes CSS rules 230 that have an end selector of 'img,' and a group that includes CSS rules 240 that have an end selector of 'p.'

The classification unit 120 may store the results of the classification in the CSS rule memory 111. In this example, the CSS rules 230 that have an end selector of 'img' include 'p img { ... }' (231), 'div img { ... }' (232), 'h1 img { ... }' (233), 'table img' { ... } (234), 'p h1 img { ... }' (235), 'div h1 img { ... }' (236), and 'a h1 img { ... }' (237).

A structure generation unit (not shown) may generate a DOM node tree using a markup language.

The generation unit 130 may generate an identification list that includes identification symbols that correspond to one or more selectors, and may store the identification list in the identification list memory 112. In the example of FIG. 1, the generation unit 130 includes an identification list generation unit 131 and an identification symbol input unit 132.

Each time the structure generation unit generates a DOM node (i.e., a child node), the identification list generation unit 131 may generate an identification list for the generated DOM node. An identification list may include identification symbols that correspond to one or more selectors.

Each time a DOM node is generated, the identification list generation unit 131 may generate an identification list for the DOM node, and the identification symbol input unit 132 may enter identification symbols that correspond to one or more selectors that are included in each parent node of the DOM node into the identification list. The identification list generation unit 131 may store the identification list in the identification list memory 112, which is further described with reference to FIG. 3.

The identification list extraction unit 140 may extract an identification list that corresponds to a target DOM node. For example, the identification list extraction unit 140 may extract an identification list from the identification list memory 112.

The rule extraction unit 150 may extract one or more target CSS rules. The rule extraction unit 150 may extract one or more CSS rules that are applicable to the target DOM node from the target CSS rules based on identification symbols that are included in the identification list that corresponds to the target DOM node. For example, the target CSS rules may be CSS rules that have an end selector that is the same as the selector of the target DOM node.

The rule extraction unit 150 may determine whether the parent node selectors that are included in the target CSS rules exist in the identification list that corresponds to the target DOM node. The rule extraction unit 150 may extract a target CSS rule that shares at least one parent node selector with the identification list corresponding to the target DOM node as a CSS rule that is applicable to the target DOM node. For example, the rule extraction unit 150 may receive the target CSS rules from the CSS rule memory 111. The rule extraction unit 150 may include one or more determiners, for example, a first, a second, and a third determiner 151, 152, and 153.

The first determiner 151 may determine whether the target CSS rules share at least one parent node selector with the identification list that corresponds to the target DOM node. If none of the target CSS rules share a parent node selector with the identification list that corresponds to the target DOM node, the rule extraction unit 150 may not extract any of the target CSS rules.

If there is a target CSS rule that shares at least one parent node selector with the identification list that corresponds to the target DOM node, the second determiner 152 may determine whether the corresponding target CSS rule shares only one parent node selector with the identification list that corresponds to the target DOM node. The rule extraction unit 150 may extract a target CSS rule that shares only one parent node selector with the identification list corresponding to the target DOM node as a CSS rule that is applicable to the target DOM node.

In an example in which a target CSS rule shares more than one parent node selector with the identification list corresponding to the target DOM node, the third determiner 153 may traverse a DOM node tree that includes the target DOM node and may determine whether the DOM node tree is configured in the same sequence as that between selectors that are included in the corresponding target CSS rule. If the DOM node tree is configured in the same sequence as that between the selectors that are included in the target CSS rule that shares more than one parent node selector with the identification list corresponding to the target DOM node, the rule extraction unit 150 may extract the corresponding target CSS rule as a CSS rule that is applicable to the target DOM node. If the DOM node tree is not configured in the same sequence as that between the selectors that are included in the target CSS rule that shares more than one parent node selector with the identification list corresponding to the target DOM node, the rule extraction unit 150 may not extract the corresponding target CSS rule.

By repeating the above-mentioned processes, the rule extraction unit 150 may extract one or more CSS rules that are applicable to the target DOM node from the target CSS rules.

In response to the target DOM node being executed, the priority determination unit 160 may set priorities between the CSS rules that are extracted by the rule extraction unit 150 such that the extracted CSS rules may be executed in order of priority.

The apparatus 100 may generate an identification list each time a DOM node is generated, and may extract one or more CSS rules that are applicable to the DOM node based on the identification list, thereby reducing the time that it takes to extract CSS rules.

Figure 3:
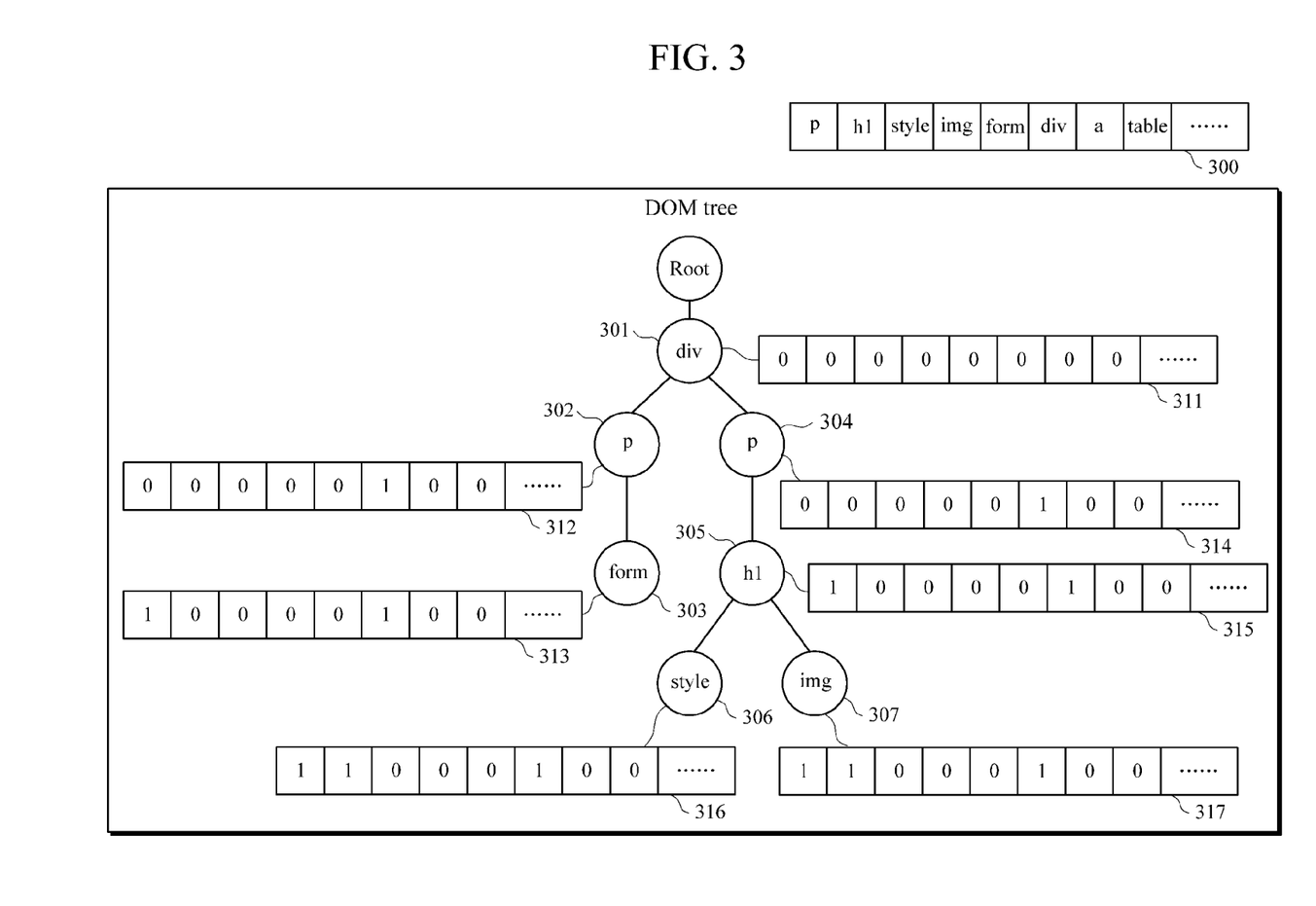
FIG. 3 is a diagram illustrating an example of the generation of an identification list.

FIG. 3 illustrates an example of the generation of an identification list. For example, the identification list may be generated by the generation unit 130 shown in FIG. 1.

Referring to FIGS. 1 and 3, an identification list 300 may have indexes for a plurality of selectors such as p, h1, style, img, form, div, a, and table. The identification list 300 may include identification symbols corresponding to the respective indexes. For example, the identification symbols may be '1' or '0,' wherein an identification symbol of '1' may indicate the existence of a selector in a parent node, a grandparent node, etc., of a target DOM node and an identification symbol of '0' may indicate the non-existence of a selector in a parent node, a grandparent node, etc., of the target DOM node. It should be appreciated that the identification symbols shown in FIG. 3 are merely examples, and various types of identification symbols may be associated with selectors.

The generation unit 130 may generate an identification list each time a DOM node is generated. For example, in response to node 'div' 301 being generated, the generation unit 130 may generate an identification list 311 for node 'div' 301. In response to node 'p' 302 being generated, the generation unit 130 may generate an identification list 312 for node 'p' 302, and may enter an identification symbol that corresponds to selector 'div,' which is included in the parent node 'div' 301, into the identification list 312.

For example, the generation unit 130 may enter the identification symbol that corresponds to selector 'div,' i.e., '1,' into a sixth spot of the identification list 312 based on indexes. In response to node 'form' 303 being generated, the generation unit 130 may generate an identification list 313 for node 'form' 303, and may enter an identification symbol (i.e., '1') that corresponds to selector 'p,' which is included in the parent node 'p' 302, into the identification list 313. The generation unit 130 may also insert an identification symbol that corresponds to 'div', which is included in the grandparent node. For example, the generation unit 130 may enter the identification symbol into a first spot and a sixth spot of the identification list 313.

In response to node 'p' 304 being generated, the generation unit 130 may generate an identification list 314 for node 'p' 304, and may enter an identification symbol that corresponds to selector 'div,' which is included in the parent node 'div' 301, into the identification list 314. For example, the generation unit 130 may enter the identification symbol that corresponds to selector 'div,' i.e., '1,' into a sixth spot of the identification list 314 based on the indexes of the identification list 314.

In response to node 'h1' 305 being generated, the generation unit 130 may generate an identification list 315 for node 'h1' 305, and may enter an identification symbol that corresponds to selector 'p,' which is included in the parent node 'p'

304, into the identification list 315. For example, the generation unit 130 may enter the identification symbol that corresponds to selector 'p,' i.e., '1,' into a first spot of the identification list 315. The generation unit 130 may also insert an identification symbol that corresponds to 'div', which is included in the grandparent node.

In response to node 'style' 306 being generated, the generation unit 130 may generate an identification list 316 for node 'style' 306, and may enter an identification symbol that corresponds to selector 'h1,' which is included in the parent node 'h1,' into the identification list 316. The generation unit 130 may also insert an identification symbol that corresponds to 'p', which is included in the grandparent node, and that corresponds to 'div', which is included in the great-grandparent node. For example, the generation unit 130 may enter the identification symbol into a first spot, a second spot, and a sixth spot of the identification list 316.

In response to node 'img' 307 being generated, the generation unit 130 may generate an identification list 317 for node 'img' 307, and may enter an identification symbol (i.e., '1') that corresponds to selector 'h1,' which is included in the parent node 'h1' 305, into the identification list 317. The generation unit 130 may also insert an identification symbol that corresponds to 'p', which is included in the grandparent node, and that corresponds to 'div', which is included in the great-grandparent node. For example, the generation unit 130 may enter the identification symbol into a first spot, a second spot, and a sixth spot of the identification list 317. As an example, the identification lists 311 through 317 may be stored in the identification list memory 112.

Figure 4:
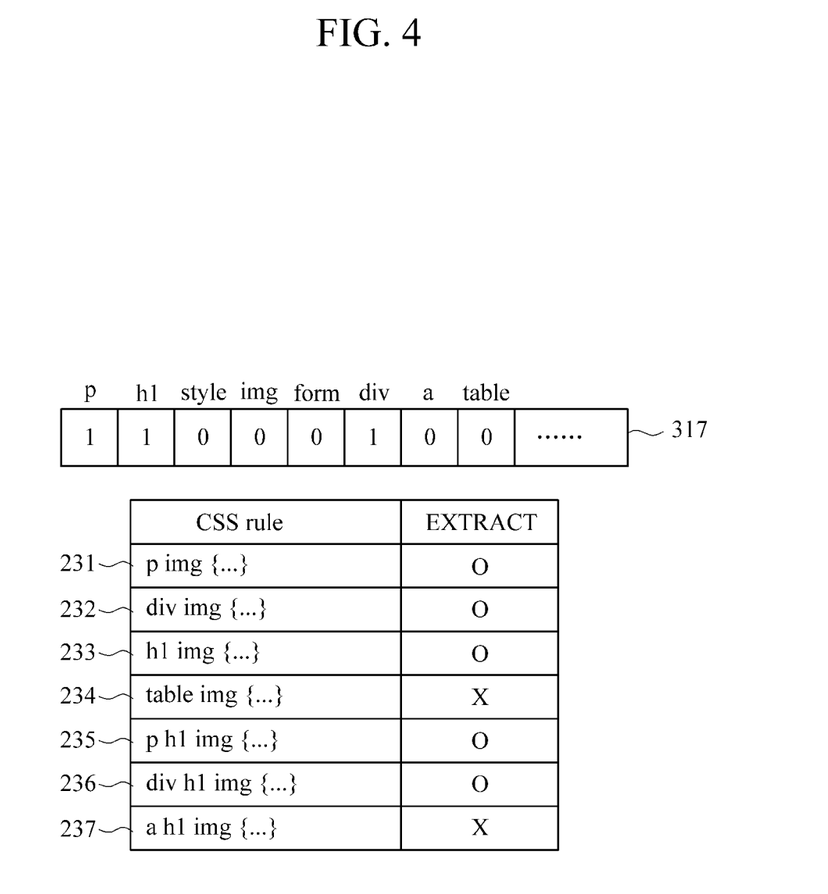
FIG. 4 is a diagram illustrating an example of the extraction of CSS rules that are applicable to a target document object model (DOM) node.

FIG. 4 illustrates an example of the extraction of CSS rules that are applicable to a target DOM node. The CSS rules may be extracted by the rule extraction unit 150.

Referring to FIGS. 1-4, in response to node 'img' 307 being a target DOM node, the rule extraction unit 150 may determine whether there are a plurality of target CSS rules that share at least one parent node selector with one of the parent nodes of node 'img' 307 and may extract one or more CSS rules that are applicable to node 'img' 307 from the target CSS rules based on the results of the determination.

For example, if node 'img' node 307 is a target DOM node, the rule extraction unit 150 may extract target CSS rules 231 through 237 that have an end selector that is the same as the selector of the target DOM node 307, i.e., 'img.' The rule extraction unit 150 may then determine whether the target CSS rules 231 through 237 share any (and only one) parent node selectors with an identification list that corresponds to the target DOM node 307, i.e., the identification list 317. The rule extraction unit 150 may extract one or more of the target CSS rules 231 through 237 as CSS rules that are applicable to the target DOM node 307 based on the results of the determination.

In this example, because the target CSS rule 231 shares only one parent node selector (i.e., 'p') with the parent nodes of the target DOM node 307, the rule extraction unit 150 may extract the target CSS rule 231, i.e., 'p img { ... },' as a CSS rule that is applicable to the target DOM node 307. In this example, the rule extraction unit 150 may extract the target CSS rules 232 and 233 as additional CSS rules that are applicable to the target DOM node 307.

In this example, because the selector 'table' included in the target CSS rule 234 does not exist in the identification list 317, the rule extraction unit 150 may not extract target CSS rule 234 as a CSS rule that is applicable to the target DOM node.

In this example, because two parent node selectors included in the target CSS rule 235, i.e., selectors 'p' and 'h1,' also exist in the identification list 317, the rule extraction unit 150 may traverse a DOM node tree that includes the target DOM node 307 and may determine whether the DOM node tree is configured in the same sequence as that between selectors 'p' and 'h1' in the target CSS rule 235. For example, the rule extraction unit 150 may identify, based on the results of the traversing, that the parent node of the target DOM node 307 is node 'h1' 305, and that the parent node of node 'h1' 305 is node 'p' 304, and may determine that the DOM node tree that includes the target DOM node 307 is configured in the same sequence as that between selectors 'p' and 'h1' in the target CSS rule 235.

In this example, the rule extraction unit 150 may extract the target CSS rule 235, i.e., 'p h1 img { ... },' as a CSS rule that is applicable to the target DOM node 307. Also, the rule extraction unit 150 may extract the target CSS rule 236, i.e., 'div h1 img { ... },' as another CSS rule that applicable to the target DOM node 307.

Because none of the selectors, except the end selector, of the target CSS rule 237 exist in the identification list 317, the rule extraction unit 150 may not extract the target CSS rule 237 as a CSS rule that is applicable to the target DOM node 307.

As described in various aspects, the rule extraction unit 150 may extract one or more CSS rules that are applicable to each DOM node in a DOM node tree.

Figure 5:
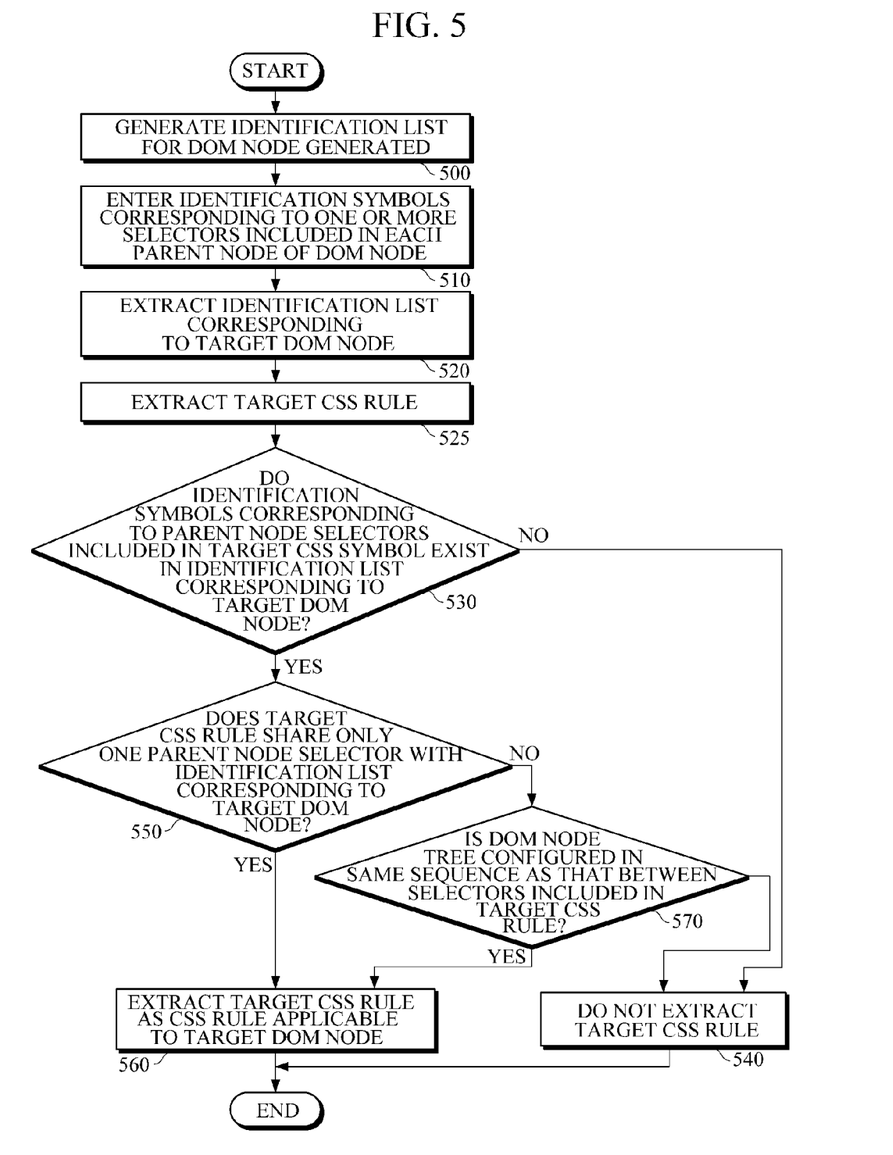
FIG. 5 is a flowchart illustrating an example of a method of extracting CSS rules.

FIG. 5 illustrates an example of a method of extracting CSS rules.

Referring to FIG. 5, each time a DOM node is generated, an apparatus for extracting CSS rules generates an identification list for the DOM node, in 500. The apparatus may enter identification symbols that correspond to one or more selectors that are included in each parent node of the DOM node into the identification list, in 510. The apparatus extracts an identification list that corresponds to a target DOM node, in 520. For example, the apparatus may extract the target DOM node from one or more DOM nodes that are generated in 500. In 525, the apparatus extracts a target CSS rule that has an end selector that is the same as the selector of the target DOM node. The apparatus determines whether the target CSS rule shares at least one parent node selector with the identification list that corresponds to the target DOM node, in 530.

If the target CSS rule does not share any parent node selector with the identification list corresponding to the target DOM node, the apparatus does not extract the target CSS rule, in 540.

If there is a target CSS rule that shares at least one parent node selector with the identification list corresponding to the target DOM node, in 550 the apparatus determines whether the corresponding target CSS rule shares only one parent node selector with the identification list corresponding to the target DOM node, and in 560 extracts the corresponding target CSS rule as a CSS rule that is applicable to the target DOM node if the corresponding target CSS rule shares only one parent node selector with the identification list that corresponds to the target DOM node.

If the target CSS rule that shares at least one parent node selector with the identification list corresponding to the target DOM node shares more than one parent node selector with the identification list corresponding to the target DOM node, in 570 the apparatus traverses a DOM node tree that includes the target DOM node, and determines whether the DOM node tree is configured in the same sequence as that between the selectors included in the corresponding target CSS rule.

If the DOM node tree is configured in the same sequence as that between the selectors included in the target CSS rule sharing more than one parent node selector with the identification list corresponding to the target DOM node, the apparatus extracts the corresponding target CSS rule as a CSS rule that is applicable to the target DOM node, in 560. If the DOM node tree is not configured in the same sequence as that between the selectors included in the target CSS rule sharing more than one parent node selector with the identification list corresponding to the target DOM node, in 540 the apparatus does not extract the corresponding target CSS rule as a CSS rule that is applicable to the target DOM node.

By repeating operations 530 through 570, the apparatus may extract one or more CSS rules that are applicable to the target DOM node.

As described above, it is possible to reduce the time that it takes to extract CSS rules by generating an identification list each time a DOM node is generated and extracting CSS rules that are applicable to the DOM node based on the identification list.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of extracting cascading style sheet (CSS) rules, the method comprising:
   generating an identification list that comprises identification symbols that correspond to a plurality of selectors, for each document object model (DOM) node included in a DOM node tree corresponding to a document, where each DOM node corresponds to one of the plurality of selectors;
   selecting a target DOM node from the DOM node tree; and
   extracting one or more target CSS rules that have an end selector that is the same as a selector corresponding to the target DOM node and which have another selector that is the same as a selector included in the identification list of the target DOM node, based on identification symbols that are included in an identification list generated for the target DOM node.

2. The method of claim 1, wherein the generating the identification list comprises generating an identification list each time a DOM node is generated.

3. The method of claim 1, wherein the generating the identification list comprises entering identification symbols that correspond to one or more selectors that are included in a parent node of each of the DOM nodes into a corresponding identification list.

4. The method of claim 1, further comprising extracting the identification list that corresponds to the target DOM node.

5. The method of claim 1, wherein the extracting the CSS rules that are applicable to the target DOM node comprises:
   determining whether a target CSS rule comprises a selector that is included in the identification list that corresponds to the target DOM node; and
   in response to the target CSS rule not comprising any selectors that are included in the identification list that corresponds to the target DOM node, the target CSS rule is not extracted as a CSS rule that is applicable to the target DOM node.

6. The method of claim 5, wherein the extracting the CSS rules that are applicable to the target DOM node further comprises:
   determining whether the target CSS rule comprises only one selector in addition to the end selector, in response to the target CSS rule comprising at least one selector that is included in the identification list that correspond to the target DOM node; and
   extracting the target CSS rule as a CSS rule that is applicable to the target DOM node, in response to the target CSS rule comprising only one selector, and the only one selector being included in the identification list that corresponds to the target DOM node.

7. The method of claim 6, wherein the extracting the CSS rules that are applicable to the target DOM node further comprises:

traversing a DOM node tree including the target DOM node and determining whether the DOM node tree is configured in the same sequence as that between the selectors included in the target CSS rule, in response to the target CSS rule comprising more than one selector that is included in the identification list that correspond to the target DOM node; and extracting the target CSS rule as a CSS rule that is applicable to the target DOM node, in response to the DOM node tree being configured in the same sequence as that between the selectors included in the target CSS rule.

8. The method of claim 1, wherein the identification symbols are 1-bit digital values.

9. An apparatus for extracting cascading style sheet (CSS) rules, the apparatus comprising:
  a processor;
  a generation unit configured to generate an identification list that comprises identification symbols that correspond to a plurality of selectors, for each document object model (DOM) node included in a DOM node tree corresponding to a document, where each DOM node corresponds to one of the plurality of selectors; and
  a rule extraction unit configured to select a target DOM node from the DOM node tree and to extract one or more target CSS rules that have an end selector that is the same as a selector corresponding to the target DOM node and which have another selector that is the same as a selector included in the identification list of the target DOM node, based on identification symbols that are included in an identification list generated for the target DOM node.

10. The apparatus of claim 9, wherein the generation unit is further configured to generate an identification list each time a DOM node is generated.

11. The apparatus of claim 9, further comprising an identification symbol input unit configured to enter identification symbols that correspond to one or more selectors that are included in a parent node of each of the DOM nodes into a corresponding identification list.

12. The apparatus of claim 9, further comprising an identification list extraction unit configured to extract the identification list that corresponds to the target DOM node.

13. The apparatus of claim 9, wherein the rule extraction unit comprises a first determiner configured to determine whether a target CSS rule comprises a selector that is included in the identification list that correspond to the target DOM node, and in response to the target CSS rule not comprising any selectors included in the identification list that corresponds to the target DOM node, the target CSS rule is not extracted as a CSS rule that is applicable to the target DOM node.

14. The apparatus of claim 13, wherein
the rule extraction unit further comprises a second determiner configured to determine whether the target CSS rule comprises only one selector in addition to the end selector, in response to the target CSS rule comprising at least one selector that is included in the identification list that correspond to the target DOM node, and
the rule extraction unit is further configured to extract the target CSS rule as a CSS rule that is applicable to the target DOM node, in response to the target CSS rule comprising only one selector and the only one selector being included in the identification list that correspond to the target DOM node.

15. The apparatus of claim 14, wherein
the rule extraction unit further comprises a third determiner configured to traverse the DOM node tree including the target DOM node and determine whether the DOM node tree is configured in the same sequence as that between the selectors included in the target CSS rule, in response to the target CSS rule comprising more than one selector that is included in the identification list that correspond to the target DOM node, and
the rule extraction unit is further configured to extract the target CSS rule as a CSS rule that is applicable to the target DOM node, in response to the DOM node tree being configured in the same sequence as that between the selectors included in the target CSS rule.

16. The apparatus of claim 9, wherein the identification symbols are 1-bit digital values.

17. The apparatus of claim 9, wherein the rule extraction unit is configured to extract the one or more CSS rules that are applicable to the target DOM node based on selectors included in a parent node of the target DOM node.

* * * * *